United States Patent
Zhi

(10) Patent No.: US 12,342,063 B2
(45) Date of Patent: Jun. 24, 2025

(54) CAMERA MODULE AND ELECTRONIC DEVICE INCLUDING A PROTECTION STRUCTURAL MEMBER, A GIMBAL CAMERA AND A SUPPORT SEAT

(71) Applicant: VIVO MOBILE COMMUNICATION CO., LTD., Guangdong (CN)

(72) Inventor: Yuan Zhi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 120 days.

(21) Appl. No.: 18/511,033

(22) Filed: Nov. 16, 2023

(65) Prior Publication Data

US 2024/0089574 A1    Mar. 14, 2024

Related U.S. Application Data

(63) Continuation of application No. PCT/CN2022/093626, filed on May 18, 2022.

(30) Foreign Application Priority Data

May 24, 2021    (CN) .......................... 202110566242.7

(51) Int. Cl.
| | |
|---|---|
| H04N 5/335 | (2011.01) |
| G03B 17/56 | (2021.01) |
| H04N 23/51 | (2023.01) |
| H04N 23/55 | (2023.01) |

(52) U.S. Cl.
CPC ........... *H04N 23/55* (2023.01); *G03B 17/561* (2013.01); *H04N 23/51* (2023.01)

(58) Field of Classification Search
CPC .................................................. G03B 17/561
See application file for complete search history.

(56) References Cited

U.S. PATENT DOCUMENTS

2017/0353663 A1    12/2017 Asakawa

FOREIGN PATENT DOCUMENTS

| | | |
|---|---|---|
| CN | 109218477 A | 1/2019 |
| CN | 109922245 A | 6/2019 |
| CN | 110784650 A | 2/2020 |
| CN | 111787212 A | 10/2020 |
| CN | 112637462 A | 4/2021 |
| CN | 113225468 A | 8/2021 |
| JP | 2005018017 A | 1/2005 |
| JP | 2005045755 A | 2/2005 |
| JP | 2005128375 A | 5/2005 |
| JP | 2017215550 A | 12/2017 |
| WO | 2006080305 A1 | 8/2006 |

*Primary Examiner* — Gary C Vieaux
(74) *Attorney, Agent, or Firm* — Price Heneveld LLP

(57) ABSTRACT

This application discloses a camera module and an electronic device. The camera module includes a protection structural member, a gimbal camera, and a support seat. The protection structural member includes a light-transmitting cover plate, and the light-transmitting cover plate is disposed opposite a lens of the gimbal camera. The support seat is switchable between a first position and a second position. The support seat includes a first support section and a second support section that are interconnected. Both the protection structural member and the gimbal camera are supported on the support seat, and the protection structural member is movable relative to the support seat in a direction of an optical axis of the lens.

20 Claims, 3 Drawing Sheets

CAMERA MODULE AND ELECTRONIC DEVICE INCLUDING A PROTECTION STRUCTURAL MEMBER, A GIMBAL CAMERA AND A SUPPORT SEAT

CROSS-REFERENCE TO RELATED APPLICATIONS

The present invention is a continuation application of PCT International Application No. PCT/CN2022/093626 filed on May 18, 2022, which claims priority to Chinese Patent Application No. 202110566242.7, filed with the China National Intellectual Property Administration on May 24, 2021 and entitled "CAMERA MODULE AND ELECTRONIC DEVICE", which are incorporated herein by reference in their entireties.

TECHNICAL FIELD

This application relates to the field of communications device technologies, and specifically, to a camera module and an electronic device.

BACKGROUND

To make it easier for users to record their lives anywhere at any time, camera modules with shooting functions are applied increasingly widely in electronic devices. In the related art, a gimbal camera is used to implement anti-shaking for a camera module in a shooting process to obtain better shooting results. However, because gimbal cameras have a large height, when a camera module equipped with a gimbal camera is installed on an electronic device, the camera module protrudes from a surface of the electronic device and forms a protrusion on the outer surface of the electronic device, affecting aesthetics of the electronic device.

SUMMARY

According to a first aspect, the present invention discloses a camera module, including a protection structural member, a gimbal camera, and a support seat.

The protection structural member includes a light-transmitting cover plate, and the light-transmitting cover plate is disposed opposite a lens of the gimbal camera.

The support seat is switchable between a first position and a second position, the support seat includes a first support section and a second support section that are interconnected, both the protection structural member and the gimbal camera are supported on the support seat, and the protection structural member is movable relative to the support seat along a direction of an optical axis of the lens.

In a case that the support seat has moved to the first position, both the protection structural member and the gimbal camera are supported on the first support section, and a distance between the lens and the light-transmitting cover plate is a first distance.

In a case that the support seat has moved to the second position, both the protection structural member and the gimbal camera are supported on the second support section, and a distance between the lens and the light-transmitting cover plate is a second distance. The first distance is smaller than the second distance.

According to a second aspect, the present invention further provides an electronic device including the foregoing camera module.

Reference signs are described as follows:

100. protection structural member; 110. protection bracket; 111. installation portion; 1111. cylindrical member; 1112. cover plate; 112. first side support plate; 113. second side support plate;

200. gimbal camera; 210. lens; 220. first side surface;

300. support seat; 310. first support surface; 320. second support surface; 330. third support surface; 340. fourth support surface; 350. first inclined guide surface; 360. second inclined guide surface; 370. first inner side wall; 300a. first support section; 300b. second support section; 300c. bottom end surface;

410. first guide protrusion; and 420. second guide protrusion.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to indicate a particular order or a particular sequence. It should be understood that data used in this way is used interchangeably in appropriate circumstances so that the embodiments of this application can be implemented in other orders than the order illustrated or described herein. In addition, "first", "second", and the like are usually used to distinguish objects of a same type, and do not restrict a quantity of objects. For example, there may be one or a plurality of first objects. In addition, "and/or" in the specification and claims represents at least one of connected objects, and the character "/" generally indicates that the contextually associated objects have an "or" relationship.

Figure 1:
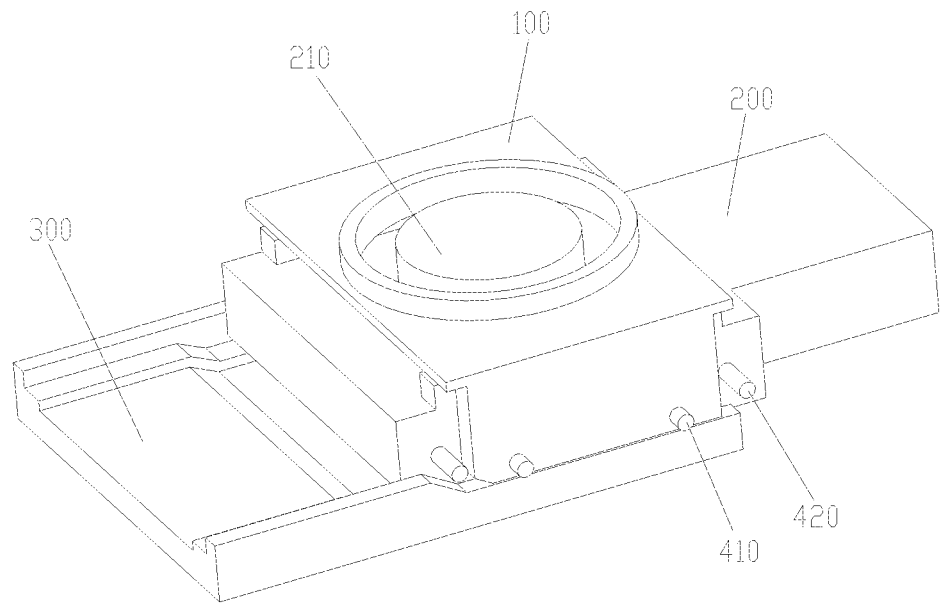
FIG. 1 is a schematic structural diagram of a camera module disclosed in an embodiment of this application when a support seat is at a first position.
Figure 2:
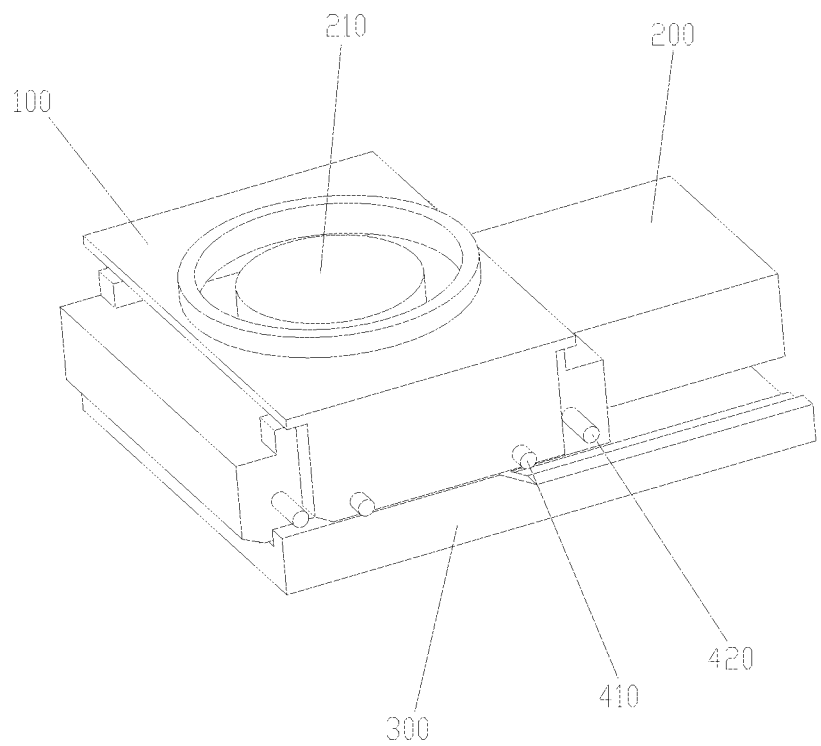
FIG. 2 is a schematic structural diagram of a camera module disclosed in an embodiment of this application when a support seat is at a second position.
Figure 3:
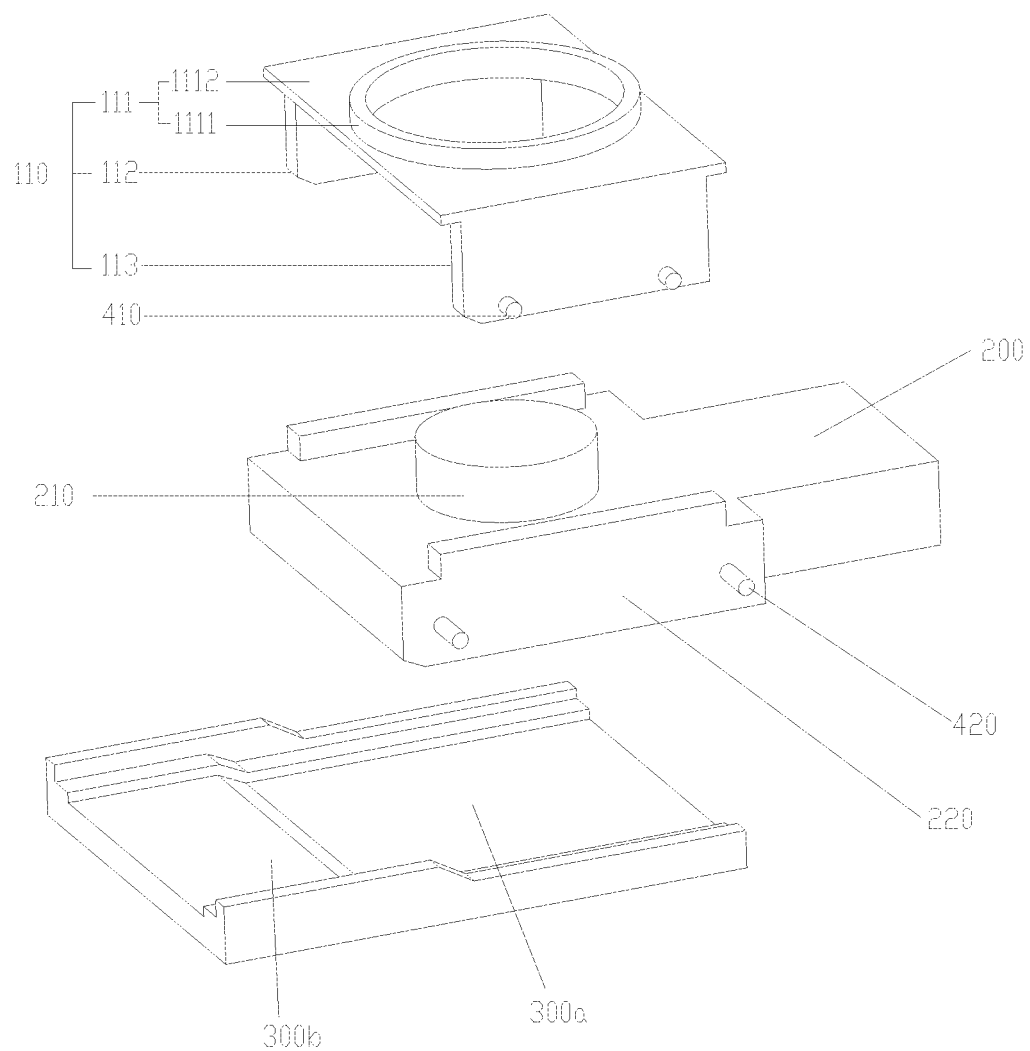
FIG. 3 is an exploded structural view of a camera module disclosed in an embodiment of this application.
Figure 4:
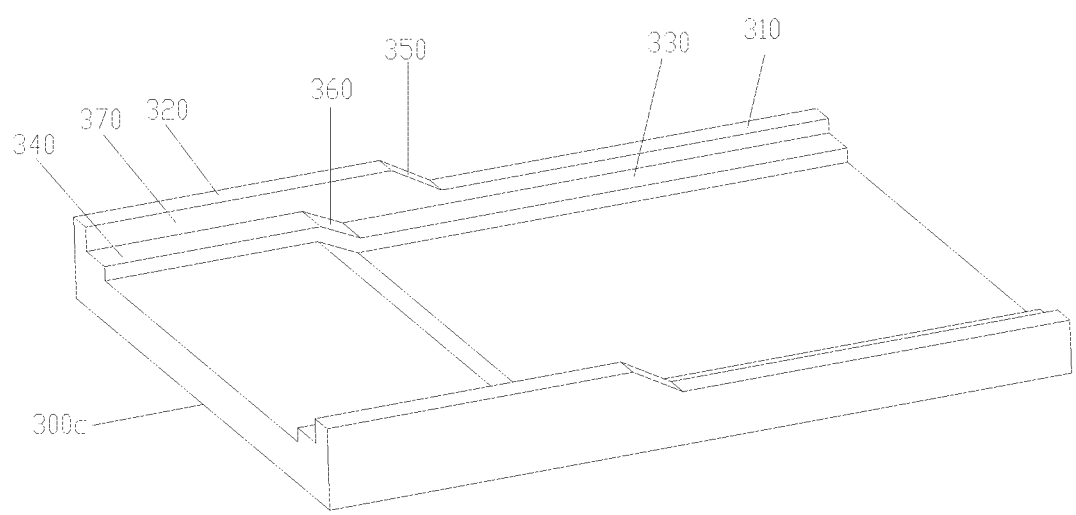
FIG. 4 is a schematic structural diagram of a support seat disclosed in an embodiment of this application.

Referring to FIG. 1 to FIG. 4, an embodiment of this application discloses a camera module, and the disclosed camera module can be applied to an electronic device. The disclosed camera module includes a protection structural member 100, a gimbal camera 200, and a support seat 300.

The protection structural member 100 includes a light-transmitting cover plate, and the gimbal camera 200 includes a lens 210. The light-transmitting cover plate and the lens 210 are disposed opposite each other to ensure that light can pass through the light-transmitting cover plate to enter the lens 210, thereby finally implementing shooting of the gimbal camera 200. Optionally, the light-transmitting cover plate may be a glass cover plate or a polymer resin cover plate.

The support seat 300 is movably disposed. In a case that the camera module is applicable to an electronic device, the support seat 300 may be movably disposed in a device housing of the electronic device. The support seat 300 moves so that the support seat 300 is switchable between a first position and a second position.

The support seat 300 includes a first support section 300a and a second support section 300b that are interconnected. Both the protection structural member 100 and the gimbal camera 200 are supported on the support seat 300, and the protection structural member 100 is movable relative to the support seat 300 in a direction of an optical axis of the lens 210. In other words, during the movement of the support seat 300, the protection structural member 100 can move in the direction of the optical axis of the lens 210 along with the movement of the support seat 300.

Specifically, in a case that the support seat 300 has moved to the first position, both the protection structural member 100 and the gimbal camera 200 are supported on the first support section 300a. A distance between the lens 210 and the light-transmitting cover plate is a first distance. In this case, because the distance between the lens 210 and the light-transmitting cover plate is small, it is difficult for the gimbal camera 200 to implement an anti-shaking movement, for example, an anti-shaking rotation.

In a case that the support seat 300 has moved to the second position, both the protection structural member 100 and the gimbal camera 200 are supported on the second support section 300b, and a distance between the lens 210 and the light-transmitting cover plate is a second distance. The first distance is smaller than the second distance. In this case, because the distance between the lens 210 and the light-transmitting cover plate is large, there is enough space between the lens 210 and the light-transmitting cover plate to implement the anti-shaking movement of the gimbal camera 200.

In other words, when the gimbal camera 200 switches from a state in which anti-shaking cannot be implemented to an anti-shaking state can be implemented, the distance between the lens 210 and the light-transmitting cover plate becomes larger to meet a requirement of the anti-shaking movement of the gimbal camera 200 on working space. It should be noted that the second distance may be a minimum distance between the lens 210 and the light-transmitting cover plate required for anti-shaking of the gimbal camera 200. Certainly, when the second distance is larger than the minimum distance, anti-shaking is implemented more easily.

In this embodiment disclosed in this application, the distance between the lens 210 and the light-transmitting cover plate is changed by changing the position of the support seat 300, so that a height of the camera module in the direction of the optical axis of the lens 210 is changed. In a case that the support seat 300 is at the first position, the distance between the lens 210 and the light-transmitting cover plate is small, thereby reducing the height of the camera module in the direction of the optical axis of the lens 210. When the camera module is installed on the electronic device, space occupied by the camera module in a thickness direction of the electronic device is reduced to achieve the purpose of reducing the protrusion. In a case that the support seat 300 is at the second position, the distance between the lens 210 and the light-transmitting cover plate is large, thereby providing space required for anti-shaking operation of the gimbal camera 200. It can be seen that the camera module disclosed in this application can resolve a problem that in the related art, the camera module equipped with the gimbal camera is high. This is conducive to reducing a height of the protrusion formed on the surface of the electronic device equipped with the camera module, thereby ultimately helping improve aesthetics of the electronic device.

The support seat 300 disclosed in this embodiment of this application may have various structures. Any structure in which the distance between the light-transmitting cover plate and the lens 210 can be changed through movement can achieve the purpose of this embodiment of this application. The specific structure of the support seat 300 is not limited in the embodiments of this application.

This application discloses a specific structure of the support seat 300. Still referring to FIG. 4, the support seat 300 may further include a bottom end surface 300c. The first support section 300a may include a first support surface 310, and the second support section 300b may include a second support surface 320. Both the first support surface 310 and the second support surface 320 are disposed facing away from the bottom end surface 300c. The first support surface 310 may be connected to the second support surface 320 through a first inclined guide surface 350. In addition, in the direction of the optical axis of the lens 210, a distance between the first support surface 310 and the bottom end surface 300c is smaller than a distance between the second support surface 320 and the bottom end surface 300c. In this case, the second support surface 320 is higher relative to a same reference surface (that is, the bottom end surface 300c).

In a specific operation process, in a case that the support seat 300 is at the first position, the protection structural member 100 is supported on the first support surface 310. During the movement of the support seat 300 from the first position to the second position, the protection structural member 100 is gradually supported on the first inclined guide surface 350, and a distance between a position at which the first inclined guide surface 350 is in contact with the protection structural member 100 and the bottom end surface 300c gradually increases, so that the first inclined guide surface 350 guides the protection structural member 100 to move in a direction away from the bottom end surface 300c, and the distance between the lens 210 and the bottom end surface 300c can remain unchanged, and thus the distance between the light-transmitting cover plate and the lens 210 gradually increases. In a case that the support seat 300 has moved to the second position, the protection structural member 100 is supported on the second support surface 320. During the movement of the support seat 300 from the second position to the first position, the protection structural member 100 is gradually supported on the first inclined guide surface 350, and the distance between the position at which the first inclined guide surface 350 is in contact with the protection structural member 100 and the bottom end surface 300c gradually decreases, so that the protection structural member 100 moves in a direction close to the bottom end surface 300c, and the distance between the lens 210 and the bottom end surface 300c can remain unchanged, so that the distance between the light-transmitting cover plate and the lens 210 gradually decreases.

Certainly, in the above operation process, as the protection structural member 100 gradually moves up or gradually moves down, the distance between the lens 210 and the bottom end surface 300c may be unchanged or changed. This is not limited in this embodiment of this application, so long as the first distance is smaller than the second distance.

In the foregoing solution, if a slope of the first inclined guide surface 350 is different, the distance between the first support surface 310 and the second support surface 320 of the support seat 300 in the direction of the optical axis of the lens 210 is different, so that the slope of the first inclined guide surface 350 can be adjusted to adjust the movement distance of the protection structural member 100 in the direction of the optical axis of the lens 210. Apparently, the support seat 300 in such a structure has the advantages such as simplicity in structure and capability of achieving the purpose of the present invention.

When the camera module in the foregoing solution is installed on the electronic device, to prevent formation of a protrusion on the surface of the electronic device, in a case that the support seat 300 is at the first position, the protection structural member 100 may be retracted into the electronic device, and the lens 210 also follows the protection structural member 100 to move into the electronic device. In addition, when the support seat 300 is at the first position and the second position, if the lens 210 does not move, in a case that the support seat 300 is at the second position, the lens 210 may alternatively be inside the electronic device. To allow light to enter the lens 210, a through hole needs to be provided in a position, corresponding to the position of the lens 210, of the device housing of the electronic device. However, to provide better protection for functional devices located inside the device housing, a size of the through hole is usually small. In this case, a shooting view field of the lens 210 is limited by the size of the through hole, thereby affecting a range of a shooting view field of the gimbal camera 200.

When the camera module is installed on the electronic device, to allow the gimbal camera 200 to achieve a larger shooting view field, the gimbal camera 200 may move relative to the support seat 300 in the direction of the optical axis of the lens 210. In other words, the gimbal camera 200 may alternatively move relative to the support seat 300 in the direction of the optical axis of the lens 210 along with the movement of the support seat 300. In this case, the gimbal camera 200 can move in a direction close to the through hole, and thus can achieve a larger shooting view field while the size of the through hole is fixed.

Similarly, the gimbal camera 200 moves in the direction of the optical axis of the lens 210 in various manners. In an optional solution, the first support section 300a may further include a third support surface 330, and the second support section 300b may further include a fourth support surface 340. Both the third support surface 330 and the fourth support surface 340 are disposed facing away from the bottom end surface 300c. The third support surface 330 may be connected to the fourth support surface 340 through a second inclined guide surface 360. In addition, in the direction of the optical axis of the lens 210, a distance between the third support surface 330 and the bottom end surface 300c is smaller than a distance between the fourth support surface 340 and the bottom end surface 300c. In this case, the third support surface 330 is lower and the fourth support surface 340 is higher relative to a same reference surface (that is, the bottom end surface 300c).

In a specific operation process, in a case that the support seat 300 has moved to the first position, the gimbal camera 200 is supported on the third support surface 330. During the movement of the support seat 300 from the first position to the second position, the gimbal camera 200 is gradually supported on the second inclined guide surface 360, and a distance between a position at which the second inclined guide surface 360 is in contact with the gimbal camera 200 and the bottom end surface 300c gradually increases, so that the second inclined guide surface 360 guides the gimbal camera 200 to move away from the bottom end surface 300c in the direction of the optical axis of the lens 210. In a case that the support seat 300 has moved to the second position, the gimbal camera 200 is supported on the fourth support surface 340. During the movement of the support seat 300 from the second position to the first position, the gimbal camera 200 is gradually supported on the second inclined guide surface 360, and the distance between the position at which the second inclined guide surface 360 is in contact with the gimbal camera 200 and the bottom end surface 300c gradually decreases, so that the gimbal camera 200 moves close to the bottom end surface 300c in the direction of the optical axis of the lens 210. This structure for implementing the movement of the gimbal camera 200 is simple and easy to implement.

In this embodiment disclosed in this application, the gimbal camera 200 can move in the direction of the optical axis of the lens 210. In a case that the camera module is installed on the electronic device, during the movement of the support seat 300 from the first position to the second position, both the protection structural member 100 and the gimbal camera 200 move in the direction away from the bottom end surface 300c, so that the lens 210 of the gimbal camera 200 can extend out of the device housing of the electronic device through the through hole to increase the shooting view field of the gimbal camera 200 and obtain a better shooting effect.

It should be noted that when the camera module is installed on the electronic device, in the thickness direction of the electronic device, the bottom end surface 300c and the through hole are adjacent to two sides of the electronic device, respectively. Specifically, a motherboard inside the electronic device can be hollowed out to avoid stacking of the camera module and the motherboard, thereby facilitating control on an overall thickness of the electronic device.

In addition, in an axis direction of the optical axis, a distance between the first support surface 310 and the third support surface 330 is smaller than a distance between the second support surface 320 and the fourth support surface 340 to ensure that during the movement of the support seat 300 from the first position to the second position, a movement distance of the light-transmitting cover plate is greater than a movement distance of the lens 210, thereby providing space required for anti-shaking operation of the gimbal camera 200.

Currently, a development trend is that electronic devices are getting thinner and thinner, and consequently, functional devices inside the electronic devices are disposed more and more compactly. During the movement of the support seat 300, if a movement trajectory of the support seat 300 deviates or has insufficient precision, the support seat 300 is likely to collide with other functional devices inside the electronic devices, thereby resulting in damages to the functional devices.

To resolve the foregoing problem, the support seat 300 may have a first inner side wall 370 and a second inner side wall that are opposite each other. The gimbal camera 200 may include a first side surface 220 and a second side surface facing away from each other. The gimbal camera 200 may be in guiding fit with the device housing of the electronic device in the direction of the optical axis of the lens 210, and may be limited in a direction perpendicular to the optical axis of the lens 210. For example, as limited by the device housing, the gimbal camera 200 can only move in the direction of the optical axis. Both the first side surface 220 and the second side surface may be set as plane structures. The first side surface 220 is in sliding fit with the first inner side wall 370, and the second side surface is in sliding fit with the second inner side wall. The first inner side wall 370, the second inner side wall, the first side surface 220, and the second side surface can all move in a same direction as the support seat 300. In this case, the first side surface 220 and the second side surface limit and guide the movement of the support seat 300, which can prevent deviation of a path of the support seat 300, thereby finally improving movement accuracy of the support seat 300 when the support seat 300 switches between the first position and the second position, and effectively avoiding interference with other functional devices in the electronic device.

In this embodiment of this application, the protection structural member 100 can provide protection. The protection structural member 100 may have various structures. In an optional solution, the protection structural member 100 may further include a protection bracket 110, and the protection bracket 110 includes an installation portion 111, a first side support plate 112, and a second side support plate 113. The installation portion 111 is supported on the support seat 300 via the first side support plate 112 and the second side support plate 113, and the light-transmitting cover plate is disposed on the installation portion 111. The first side support plate 112 and the second side support plate 113 are supported on the support seat 300 and drive the protection bracket 110 to move in the direction of the optical axis of the lens 210 along with the movement of the support seat 300. For example, in a case that the support seat 300 has moved to the first position, the first side support plate 112 and the second side support plate 113 are supported on their respective corresponding first support surfaces 310. In a case that the support seat 300 has moved to the second position, the first side support plate 112 and the second side support plate 113 are supported on their respective corresponding second support surfaces 320.

The first side support plate 112 is in sliding fit with the first side surface 220 in a movement direction of the support seat 300, and the second side support plate 113 is in sliding fit with the second side surface in the movement direction of the support seat 300. In this case, the gimbal camera 200 and the protection structural member 100 limit each other, thereby maintaining a fitting relationship therebetween more easily.

A specific structure of the installation portion 111 is disclosed herein. Certainly, other structures may also be used, which is not limited herein. Specifically, the installation portion 111 may include a cylindrical member 1111 and a cover plate 1112 surrounding the cylindrical member 1111. The light-transmitting cover plate is disposed on the cylindrical member 1111, and a whole formed by the cover plate 1112 and the light-transmitting cover plate covers the lens 210 to protect the lens 210.

In an optional embodiment, a first bottom end surface of the protection structural member 100 facing towards the support seat 300 may be in support fit with the first support section 300*a* or the second support section 300*b*, and/or a second bottom end surface of the gimbal camera 200 facing towards the support seat 300 may be in support fit with the first support section 300*a* or the second support section 300*b*.

In this case, the protection structural member 100 and the gimbal camera 200 are supported on the support seat 300 a bottom support manner. When the protection structural member 100 is impacted by an external force, the overall first bottom end surface bears the external force, with a large force bearing area and uniform force distribution. This can prevent breakage of a support position of the protection structural member 100 caused by uneven force distribution or small force bearing area. Similarly, when the gimbal camera 200 is impacted by an external force, the overall second bottom end surface bears the external force, with a large force bearing area and uniform force distribution. This can prevent breakage of a support position of the gimbal camera 200 caused by uneven force distribution or small force bearing area.

In the foregoing solution, during the movement of the support seat 300 from the second position to the first position, a user can apply a force to the protection structural member 100 in a direction towards the support seat 300 through manual operation, so that the protection structural member 100 moves in the direction towards the support seat 300 and is supported on the first support section 300*a*. However, the manual operation is not in line with a current development trend of electronic device automation, thereby affecting user experience. To resolve the foregoing problem, the electronic device may further include an elastic member. When the camera module is installed on the electronic device, the elastic member is connected between the device housing of the electronic device and the protection structural member 100. The elastic member can drive the protection structural member 100 to abut against the support seat 300, thereby facilitating reset of the protection structural member 100.

In a specific operation process, in a case that the support seat 300 is at the first position, the elastic member drives the protection structural member 100 to drive the light-transmitting cover plate to move to the protection structural member 100, so that the light-transmitting cover plate is supported on the first support section 300*a*. In this case, the elastic member may be in a natural state. In a case that the support seat 300 is at the second position, the elastic member is compressed or stretched to have elastic deformation, so that the elastic member accumulates a force needed for driving the protection structural member 100 to move the light-transmitting cover plate in a direction close to the support seat 300. Certainly, the elastic member may alternatively be disposed in other manners. This is not limited herein.

In other words, when the camera module is installed on the electronic device, driven by the elastic member, the protection structural member 100 can be retracted into the electronic device, and it is ensured that the protection structural member 100 does not extend out of the electronic device when the gimbal camera 200 is in a non-operating state.

When the camera module is installed on the electronic device, in a state switching process of the camera module, at least a part of the camera module needs to extend out of the electronic device through the through hole of the device housing of the electronic device or be retracted into the electronic device through the through hole. In this case, if the movement direction of the camera module deviates, the camera module collides with the electronic device, thereby causing damage to the camera module.

To resolve the foregoing problem, the protection structural member 100 may be provided with a first guide protrusion 410. The first guide protrusion 410 is in sliding fit with the device housing of the electronic device in the direction of the optical axis of the lens 210. In a specific design and implementation process, a first guide groove may be provided on the device housing of the electronic device, and the first guide protrusion 410 is in sliding fit with the first guide groove in the extension direction of the optical axis of the lens 210 to prevent deviation of the movement trajectory of the protection structural member 100, thereby preventing damage to the protection structural member 100 caused by collision between the protection structural member 100 and other functional devices of the electronic device.

Similarly, the gimbal camera 200 may be provided with a second guide protrusion 420, and the second guide protrusion 420 is in sliding fit with the device housing of the electronic device in the direction of the optical axis of the lens 210. In a specific design and implementation process, a second guide groove may be provided on the device housing of the electronic device, and the second guide protrusion 420 is in sliding fit with the second guide groove in the extension direction of the optical axis of the lens 210 to prevent deviation of the movement trajectory of the gimbal camera 200, thereby preventing damage to the gimbal camera 200 caused by collision between the gimbal camera 200 and other functional devices of the electronic device.

In this embodiment disclosed in this application, the movement of the support seat 300 may be implemented through manual operation. For example, the camera module may include an operation key. The operation key is connected to the support seat. The support seat 300 is pushed to move by pushing the operation key. When the camera module is installed on the electronic device, the operation key may be installed on the device housing of the electronic device, and the device housing of the electronic device is provided with an opening. A part of the operation key is located outside the device housing, and another part extends into the device housing by passing through the opening and is connected to the support seat 300. The operation key can move relative to the device housing so as to drive the support seat 300 to move. However, this manner is likely to be affected by human factors. Therefore, it is difficult to accurately control the movement distance of the support seat 300. When the movement distance is excessively large, the camera module is likely to come out of the electronic device, or the camera module hits the electronic device heavily, resulting in damage to the camera module. In addition, in this manner, the operation key is likely to be mistakenly operated, thereby mistakenly triggering the support seat 300, so that the protection structural member 100 or the gimbal camera 200 unexpectedly extends out or is retracted. Finally, the normal shooting operation and user experience are affected.

To resolve the foregoing problem, in this embodiment disclosed in this application, the camera module may further include a drive apparatus, the drive apparatus is connected to the support seat 300, and the drive apparatus drives the support seat 300 to switch between the first position and the second position. Optionally, the drive apparatus may be a linear motor, a cylinder, a stepping motor, a piezoelectric ceramic, or an SMA. The drive apparatus may further be a stepping motor, and when the drive apparatus is a stepping motor, the stepping motor may be connected to the support seat 300 by using a transmission component such as a ball screw. The drive apparatus can make the control of the camera module more automatic and intelligent, which helps improve use performance of the camera module.

Based on the camera module in the foregoing embodiments of this application, an embodiment of this application further discloses an electronic device, and the disclosed electronic device includes the camera module in the foregoing embodiments.

The electronic device may further include a device housing. The device housing is provided with an inner cavity and a through hole communicating with the inner cavity. The camera module is disposed in the device housing. The support seat 300 is movably disposed in the inner cavity. The through hole is arranged opposite the lens 210. That is, an axis direction of the through hole coincides with the direction of the optical axis of the lens 210.

In a case that the support seat 300 is at the first position, the protection structural member 100 is retracted into the device housing and the light-transmitting cover plate is located in the through hole. In a case that the support seat 300 is at the second position, the light-transmitting cover plate at least partially extends out of the device housing.

To prevent unnecessary interference during the movement of the camera module, the installation portion 111 is in limiting fit with the through hole in the movement direction of the support seat 300, so that the protection structural member 100 can only move along the axis direction of the through hole.

To prevent the protection structural member 100 from extending out of the device housing excessively, in a case that the support seat 300 has moved to the second position, the cover plate 1112 is in limiting contact with the surface on which an inner side port of the through hole is located, so that the protection structural member 100 is prevented from extending out excessively when the protection structural member 100 extends out of the housing.

The electronic device disclosed in the embodiments of this application may be a smart phone, a tablet computer, an e-book reader, or a wearable device. Certainly, the electronic device may alternatively be other devices, which is not limited in the embodiments of this application.

The embodiments of this application are described above with reference to the accompanying drawings, but this application is not limited to the foregoing specific implementations. The foregoing specific implementations are merely illustrative rather than restrictive. Inspired by this application, persons skilled in the art can still derive many variations without departing from the essence of this application and the protection scope of the claims. All these variations shall fall within the protection of this application.

What is claimed is:

1. A camera module, comprising a protection structural member, a gimbal camera, and a support seat, wherein
   the protection structural member comprises a light-transmitting cover plate, and the light-transmitting cover plate is disposed opposite a lens of the gimbal camera;
   the support seat is switchable between a first position and a second position; the support seat comprises a first support section and a second support section that are interconnected; both the protection structural member and the gimbal camera are supported on the support seat; and
   the protection structural member is movable relative to the support seat in a direction of an optical axis of the lens;
   in a case that the support seat has moved to the first position, both the protection structural member and the gimbal camera are supported on the first support section, and a distance between the lens and the light-transmitting cover plate is a first distance; and
   in a case that the support seat has moved to the second position, both the protection structural member and the gimbal camera are supported on the second support section, and a distance between the lens and the light-transmitting cover plate is a second distance, wherein the first distance is smaller than the second distance.

2. The camera module according to claim 1, wherein the support seat comprises a bottom end surface; the first support section comprises a first support surface; the second support section comprises a second support surface; and both the first support surface and the second support surface are disposed facing away from the bottom end surface;

in a case that the support seat has moved to the first position, the protection structural member is supported on the first support surface; and in a case that the support seat has moved to the second position, the protection structural member is supported on the second support surface;

in the direction of the optical axis of the lens, a distance between the first support surface and the bottom end surface is smaller than a distance between the second support surface and the bottom end surface; and the support seat further comprises a first inclined guide surface, and the first inclined guide surface is connected between the first support surface and the second support surface.

3. The camera module according to claim 2, wherein the first support section further comprises a third support surface, the second support section further comprises a fourth support surface, and both the third support surface and the fourth support surface are disposed facing away from the bottom end surface;

the gimbal camera is movable relative to the support seat in the direction of the optical axis of the lens;

in a case that the support seat has moved to the first position, the gimbal camera is supported on the third support surface; and in a case that the support seat has moved to the second position, the gimbal camera is supported on the fourth support surface;

in the direction of the optical axis of the lens, a distance between the third support surface and the bottom end surface is smaller than a distance between the fourth support surface and the bottom end surface;

in the direction of the optical axis of the lens, a distance between the first support surface and the third support surface is smaller than a distance between the second support surface and the fourth support surface; and the support seat further comprises a second inclined guide surface, and the second inclined guide surface is connected between the third support surface and the fourth support surface.

4. The camera module according to claim 1, wherein the support seat has a first inner side wall and a second inner side wall; the first inner side wall is opposite the second inner side wall; the gimbal camera comprises a first side surface and a second side surface facing away from each other; the first side surface is in sliding fit with the first inner side wall; and the second side surface is in sliding fit with the second inner side wall.

5. The camera module according to claim 4, wherein the protection structural member further comprises a protection bracket; the protection bracket comprises an installation portion, a first side support plate, and a second side support plate; the installation portion is supported on the support seat via the first side support plate and the second side support plate; and the light-transmitting cover plate is disposed on the installation portion;

the first side support plate and the second side support plate are supported on the support seat and drive the protection bracket to move in the direction of the optical axis of the lens along with the movement of the support seat;

the first side support plate is in sliding fit with the first side surface in a movement direction of the support seat; and the second side support plate is in sliding fit with the second side surface in the movement direction of the support seat.

6. The camera module according to claim 5, wherein the installation portion comprises a cylindrical member and a cover plate surrounding the cylindrical member, the light-transmitting cover plate is disposed in the cylindrical member, and a whole formed by the cover plate and the light-transmitting cover plate covers the lens.

7. The camera module according to claim 1, wherein a first bottom end surface of the protection structural member facing towards the support seat is in support fit with the first support section or the second support section; and/or a second bottom end surface of the gimbal camera facing towards the support seat is in support fit with the first support section or the second support section.

8. The camera module according to claim 1, wherein the camera module further comprises an elastic member, the elastic member is connected between the protection structural member and a device housing of an electronic device, and the elastic member is able to drive the protection structural member to abut against the support seat.

9. The camera module according to claim 1, wherein the protection structural member is provided with a first guide protrusion, and the first guide protrusion is in sliding fit with the device housing of the electronic device in an extension direction of the optical axis of the lens; and/or the gimbal camera is provided with a second guide protrusion, the second guide protrusion is in sliding fit with the device housing of the electronic device along the extension direction of the optical axis of the lens.

10. The camera module according to claim 1, wherein the electronic device further comprises a drive apparatus, the drive apparatus is connected to the support seat, and the drive apparatus drives the support seat to switch between the first position and the second position.

11. An electronic device, comprising a camera module;

wherein, the camera module comprises a protection structural member, a gimbal camera, and a support seat, wherein the protection structural member comprises a light-transmitting cover plate, and the light-transmitting cover plate is disposed opposite a lens of the gimbal camera;

the support seat is switchable between a first position and a second position; the support seat comprises a first support section and a second support section that are interconnected; both the protection structural member and the gimbal camera are supported on the support seat; and the protection structural member is movable relative to the support seat in a direction of an optical axis of the lens;

in a case that the support seat has moved to the first position, both the protection structural member and the gimbal camera are supported on the first support section, and a distance between the lens and the light-transmitting cover plate is a first distance; and in a case that the support seat has moved to the second position, both the protection structural member and the gimbal camera are supported on the second support section, and a distance between the lens and the light-transmitting cover plate is a second distance, wherein the first distance is smaller than the second distance.

12. The electronic device according to claim 11, wherein, the support seat comprises a bottom end surface; the first support section comprises a first support surface; the second support section comprises a second support surface; and both the first support surface and the second support surface are disposed facing away from the bottom end surface;
  in a case that the support seat has moved to the first position, the protection structural member is supported on the first support surface; and in a case that the support seat has moved to the second position, the protection structural member is supported on the second support surface;
  in the direction of the optical axis of the lens, a distance between the first support surface and the bottom end surface is smaller than a distance between the second support surface and the bottom end surface; and
  the support seat further comprises a first inclined guide surface, and the first inclined guide surface is connected between the first support surface and the second support surface.

13. The electronic device according to claim 12, wherein the first support section further comprises a third support surface, the second support section further comprises a fourth support surface, and both the third support surface and the fourth support surface are disposed facing away from the bottom end surface;
  the gimbal camera is movable relative to the support seat in the direction of the optical axis of the lens;
  in a case that the support seat has moved to the first position, the gimbal camera is supported on the third support surface; and in a case that the support seat has moved to the second position, the gimbal camera is supported on the fourth support surface;
  in the direction of the optical axis of the lens, a distance between the third support surface and the bottom end surface is smaller than a distance between the fourth support surface and the bottom end surface;
  in the direction of the optical axis of the lens, a distance between the first support surface and the third support surface is smaller than a distance between the second support surface and the fourth support surface; and
  the support seat further comprises a second inclined guide surface, and the second inclined guide surface is connected between the third support surface and the fourth support surface.

14. The electronic device according to claim 11, wherein the support seat has a first inner side wall and a second inner side wall; the first inner side wall is opposite the second inner side wall; the gimbal camera comprises a first side surface and a second side surface facing away from each other; the first side surface is in sliding fit with the first inner side wall; and the second side surface is in sliding fit with the second inner side wall.

15. The electronic device according to claim 14, wherein the protection structural member further comprises a protection bracket; the protection bracket comprises an installation portion, a first side support plate, and a second side support plate; the installation portion is supported on the support seat via the first side support plate and the second side support plate; and the light-transmitting cover plate is disposed on the installation portion;
  the first side support plate and the second side support plate are supported on the support seat and drive the protection bracket to move in the direction of the optical axis of the lens along with the movement of the support seat;
  the first side support plate is in sliding fit with the first side surface in a movement direction of the support seat; and
  the second side support plate is in sliding fit with the second side surface in the movement direction of the support seat.

16. The electronic device according to claim 15, wherein the installation portion comprises a cylindrical member and a cover plate surrounding the cylindrical member, the light-transmitting cover plate is disposed in the cylindrical member, and a whole formed by the cover plate and the light-transmitting cover plate covers the lens.

17. The electronic device according to claim 11, wherein a first bottom end surface of the protection structural member facing towards the support seat is in support fit with the first support section or the second support section; and/or
  a second bottom end surface of the gimbal camera facing towards the support seat is in support fit with the first support section or the second support section.

18. The electronic device according to claim 11, wherein the camera module further comprises an elastic member, the elastic member is connected between the protection structural member and a device housing of an electronic device, and the elastic member is able to drive the protection structural member to abut against the support seat.

19. The electronic device according to claim 11, wherein the protection structural member is provided with a first guide protrusion, and the first guide protrusion is in sliding fit with the device housing of the electronic device in an extension direction of the optical axis of the lens; and/or
  the gimbal camera is provided with a second guide protrusion, the second guide protrusion is in sliding fit with the device housing of the electronic device along the extension direction of the optical axis of the lens.

20. The electronic device according to claim 11, wherein the electronic device comprises a device housing, the device housing is provided with an inner cavity and a through hole communicating with the inner cavity, the camera module is disposed in the device housing, the support seat is movably disposed in the inner cavity, and the through hole is arranged opposite the lens; and
  in a case that the support seat is at the first position, the protection structural member is retracted into the device housing and the light-transmitting cover plate is located in the through hole, and in a case that the support seat is at the second position, the light-transmitting cover plate at least partially extends out of the device housing.

* * * * *